E. A. MILHAUPT.
BUMPER BRACKET.
APPLICATION FILED JUNE 17, 1921.

1,390,633.

Patented Sept. 13, 1921.

INVENTOR.
Edgar A. Milhaupt
BY
Erwin Wheeler & Woolsey
ATTORNEYS.

UNITED STATES PATENT OFFICE.

EDGAR A. MILHAUPT, OF APPLETON, WISCONSIN.

BUMPER-BRACKET.

1,390,633.  Specification of Letters Patent.  Patented Sept. 13, 1921.

Application filed June 17, 1921. Serial No. 478,294.

*To all whom it may concern:*

Be it known that I, EDGAR A. MILHAUPT, a citizen of the United States, residing at Appleton, county of Outagamie, and State of Wisconsin, have invented new and useful Improvements in Bumper-Brackets, of which the following is a specification.

This invention relates to improvements in brackets for the attachment of bumpers to the frames of motor vehicles.

It is the object of this invention to provide means for attaching a bumper to a vehicle frame without boring holes in the frame to receive the attaching means.

It is a further object of this invention to provide a type of bracket which may be adapted for use at the rear of a vehicle frame thereby enabling the vehicle owner to use the same set of bumper brackets either upon the rear or the front of his vehicle.

In the drawings.

Like parts are identified by the same reference characters throughout the several views.

Figure 1:
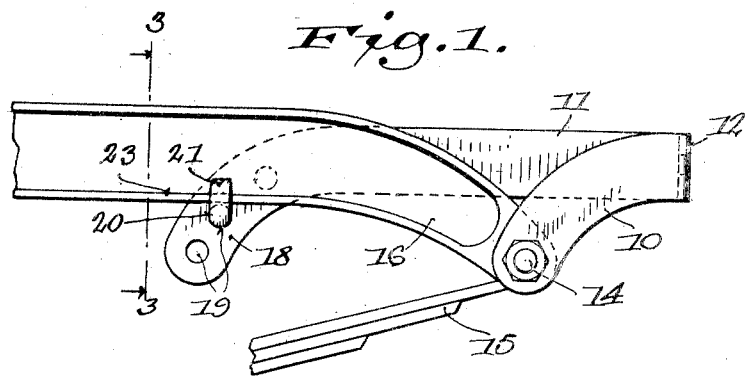
Figure 1 represents a bumper bracket embodying this invention attached to the front of the left hand frame member in position for use.

The bracket comprises a pair of arms 10 and 11 of differing lengths joined by an integral transverse section 12 to which the bumper may be attached. Each of the arms 10 and 11 is bent downwardly adjacent to its free end to frame engaging position.

The shorter arm 10 is provided near its end with a hole 13 adapted to receive the spring shackle bolt 14 by which the spring 15 is attached to frame member 16. It will be found that this bolt is ordinarily long enough to receive and hold securely the arm 10 of the bracket. If the bolt is too short, however, it is a very simple matter to provide a longer shackle bolt so that the firm end of the bracket member may be secured to the frame by said bolt without necessitating the boring of additional holes in the frame.

The longer arm 11 of the bracket is carried rearwardly in a horizontal direction past the curved portion of the frame member 16 and is then bent downwardly as shown at 18. In the curved or downwardly bent portion of this arm of the bracket, a plurality of holes 19 are provided through any one of which may be inserted the shank 20 of hook 21. Vehicle frames are ordinarily made of channel iron in the form illustrated herein and the hook 21 is adapted to be engaged over the lower flange 23 of the frame member 16. A nut 24 is threaded on to the shank 20 of hook 21 whereby the rear end portion 18 of bracket arm 11 can be retained in close contact with the frame member 16.

It will be apparent to those skilled in the art that a bumper bracket constructed in accordance with this invention will prove to be extremely easy to handle since it may be attached to any vehicle frame without boring holes therein. The provision of a plurality of holes 19 in the bracket arm 11 allows the bracket to be adapted to any one of a number of different forms of frame members 16.

Not only will a bracket constructed in accordance with this invention be unusually strong and rigid when mounted in place upon a vehicle but by reason of the fact that no holes are bored in the frame to receive the bracket, the frame will be unweakened by the attachment of the bracket and will even be strengthened thereby.

Figure 2:
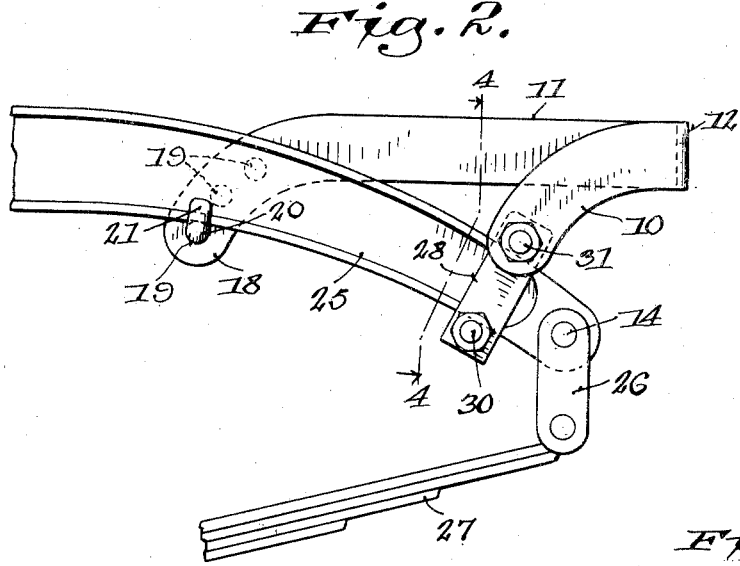
Fig. 2 represents the same bracket adapted for use upon the rear end of the right hand frame member.
Figure 3:
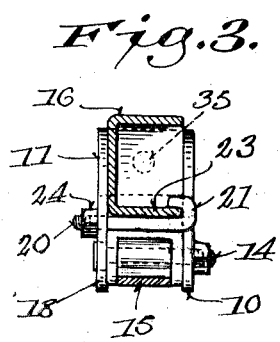
Fig. 3 is a section on line 3—3 of Fig. 1.
Figure 4:
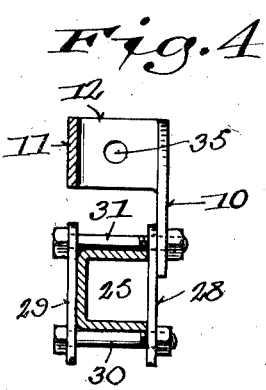
Fig. 4 is a section on the line 4—4 of Fig. 2.
Figure 5:
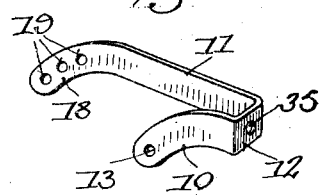
Fig. 5 is a perspective view upon a smaller scale of the bracket member.

It will be noted that the bracket shown in Fig. 2 applied to the rear of the right hand frame member is not a modification of the bracket shown in Fig. 1. It is identically the same bracket and is adapted for use upon the rear of the vehicle by the provision of a separate adapting device. It would be impractical to engage arm 10 of the bracket with the shackle bolt 14 at the rear of the frame member 25 since bolt 14 is supported by links 26 exterior to the frame member which, due to the flexion of spring 27, have considerable motion relative to the frame. Also, the rear end of the frame members ordinarily has greater curvature than the front end. For this reason, I have provided a pair of plates 28 and 29 adapted to be clamped about the frame member 25 by means of bolts 30 and 31 which pass respectively below and above the frame member. The bolt 31 serves the same purpose as is served by the shackle bolt 14 of the car when it is received in the opening 13 of the arm 10 of the bracket. By means of the very simple adapting device illustrated, the bracket 11 is thus made attachable to the rear of the vehicle. The longer arm 18 of the bracket is secured to frame member 25 in much the same manner in which it is secured to frame member 16 at the front of the car. It will be noted that due to the increased curvature of frame member 25 and due to the fact that the short arm 10 is mounted above the end of said member the shank of hook 21 has been inserted through the lower of holes 19 thereby raising arm 18 of the bracket to a height corresponding to that of arm 10. It will be obvious that by means of the adjustments made possible by the adapting device and the provision of a plurality of openings in the long arm 18 of the bracket, said bracket may always be maintained in a horizontal position upon any frame member with which it is to be used.

It will be observed that the improved bracket embodying this invention is adapted for use in mounting any type of spring bumper upon any type of vehicle. The means whereby the bumper will be supported from the bracket will vary according to the type of bumper to be supported. In a companion application filed on even date herewith, I have shown and described a particular type of bumper with which this bracket may be used. The bumper therein described is held in place upon the bracket by U-shaped clips but by way of provision for other bumpers not equipped with such attaching means a hole 35 may be made in the section 12 of the bracket which hole is adapted to receive a bolt or other attaching means for securing any bumper thereto.

I claim:

1. The combination with a vehicle frame member and a shackle bolt carried thereby, of a bumper bracket provided with substantially parallel arms of unequal length adapted to engage said frame member upon opposite sides, and means for securing the longer arm of said bracket to the frame member, the shorter arm of said bracket being adapted to be supported by said shackle bolt.

2. A bumper bracket comprising a transverse member, an extended longitudinal arm at one end of said transverse member having a downwardly bent apertured portion, and a shorter longitudinal arm at the other end of said transverse portion downwardly bent and apertured at its free end.

3. The combination with a channeled frame member downwardly curved at its end, and a shackle bolt carried thereby, of a pair of substantially parallel longitudinal arms of different lengths, a transverse member spacing said arms apart whereby they may be engaged with opposite sides of said frame member, a hook adapted to engage one flange of said channeled frame member, and means whereby said hook may be engaged with the longer arm of the bracket at any one of a plurality of points, the shorter arm being downwardly bent and apertured to receive said shackle bolt.

4. A bumper bracket comprising a pair of substantially parallel arms of unequal length downwardly bent to approximately the same distance below the horizontal line of said bracket, a transverse bar spacing said arms apart at approximately the width of a vehicle frame member, and means for attaching each arm of the bracket to a vehicle frame member without boring holes therein.

EDGAR A. MILHAUPT.